(12) United States Patent
Zhang et al.

(10) Patent No.: US 12,472,315 B1
(45) Date of Patent: Nov. 18, 2025

(54) TRIGGER ASSEMBLY FOR INHALER, AND INHALER

(71) Applicant: SUZHOU SINGMED MEDICAL DEVICE SCIENCE AND TECHNOLOGY LTD., Suzhou (CN)

(72) Inventors: Fei Zhang, Jiangsu Province (CN); Xiaoyuan Sun, Jiangsu Province (CN); Guangtao Zhao, Jiangsu Province (CN)

(73) Assignee: SUZHOU SINGMED MEDICAL DEVICE SCIENCE AND TECHNOLOGY LTD., Jiangsu Province (CN)

( * ) Notice: Subject to any disclaimer, the term of this patent is extended or adjusted under 35 U.S.C. 154(b) by 0 days.

(21) Appl. No.: 19/034,291

(22) Filed: Jan. 22, 2025

Related U.S. Application Data

(63) Continuation of application No. PCT/CN2024/129064, filed on Oct. 31, 2024.

(30) Foreign Application Priority Data

Jul. 3, 2024 (CN) .......................... 202410885061.4

(51) Int. Cl.
   *A61M 15/00* (2006.01)

(52) U.S. Cl.
   CPC . *A61M 15/0001* (2014.02); *A61M 2202/0007* (2013.01); *A61M 2202/04* (2013.01);
   (Continued)

(58) Field of Classification Search
   CPC ...... A61M 15/00–0001; A61M 15/009; A61M 2202/0007; A61M 2202/04;
   (Continued)

(56) References Cited

U.S. PATENT DOCUMENTS

| 4,565,302 A | * | 1/1986 | Pfeiffer | ................... G01F 15/00 |
| | | | | 235/117 A |
| 2013/0206136 A1 | | 8/2013 | Herrmann et al. | |

(Continued)

FOREIGN PATENT DOCUMENTS

| CN | 101203259 A | 6/2008 |
| CN | 201252008 Y | 6/2009 |

(Continued)

*Primary Examiner* — Rachel T Sippel
*Assistant Examiner* — Gwynneth L Howell
(74) *Attorney, Agent, or Firm* — FisherBroyles, LLP; John K. Shimmick

(57) ABSTRACT

A trigger assembly for an inhaler and an inhaler is provided. The trigger assembly includes: a first component including a guide support; a second component, the first component and the second component are configured such that the second component can move away from the first component to a preloaded position in the case where the second component rotates relative to the first component in a first direction; and a first actuator configured to block the second component from leaving the preloaded position in the case where the second component has been moved to the preloaded position, and configured to, upon being triggered, release the second component such that the second component moves to a triggered position toward the first component; the first actuator abuts against the guide support.

18 Claims, 11 Drawing Sheets

(52) U.S. Cl.
CPC ............... *A61M 2205/0216* (2013.01); *A61M 2205/8275* (2013.01)

(58) Field of Classification Search
CPC .. A61M 2205/0216; A61M 2205/8275; A61M 2205/27; A61M 2205/276; A61M 11/00; A61M 11/08
See application file for complete search history.

(56) References Cited

U.S. PATENT DOCUMENTS

| | | | | |
|---|---|---|---|---|
| 2015/0040893 | A1* | 2/2015 | Besseler | A61M 15/0071 128/200.21 |
| 2018/0368477 | A1* | 12/2018 | Ede | A61M 15/06 |
| 2019/0030268 | A1* | 1/2019 | Huang | A61K 31/439 |
| 2022/0047820 | A1* | 2/2022 | Säll | A61M 15/0036 |
| 2022/0047823 | A1* | 2/2022 | Säll | B05B 11/1091 |
| 2023/0277783 | A1* | 9/2023 | Herrmann | A61M 15/002 128/200.14 |
| 2023/0321365 | A1* | 10/2023 | Tang | A61M 11/007 128/200.14 |

FOREIGN PATENT DOCUMENTS

| | | |
|---|---|---|
| CN | 112752614 A | 5/2021 |
| CN | 115835897 A | 3/2023 |
| CN | 117548251 A | 2/2024 |
| CN | 117550227 A | 2/2024 |
| CN | 117815495 A | 4/2024 |
| CN | 117838997 A | 4/2024 |
| CN | 118105581 A | 5/2024 |
| CN | 118594803 A | 9/2024 |
| CN | 118807039 A | 10/2024 |
| CN | 118807040 A | 10/2024 |
| WO | 03020436 A1 | 3/2003 |

\* cited by examiner

TRIGGER ASSEMBLY FOR INHALER, AND INHALER

CROSS REFERENCE TO RELATED APPLICATIONS

The present application is a continuation of the international application PCT/CN2024/129064, filed on Oct. 31, 2024 and entitled "TRIGGER ASSEMBLY FOR INHALER, AND INHALER", and the international application claims the right of priority of the Chinese patent application No. 202410885061.4 filed on Jul. 3, 2024 and entitled "TRIGGER ASSEMBLY FOR INHALER, AND INHALER", which is incorporated herein by reference in its entirety.

TECHNICAL FIELD

The present disclosure relates to the technical field of atomization, and in particular to a trigger assembly for an inhaler, and an inhaler.

BACKGROUND

Inhalers can atomize a liquid (e.g., a medical liquid) into droplets. In the related art, a container in an inhaler contains a liquid to be atomized or sprayed, and during the movement of the container relative to a spraying assembly, the liquid in the container can be atomized, and the atomized liquid can be sprayed out of a spray nozzle of the spraying assembly. However, triggering of this inhaler is typically unstable, resulting in that liquid spraying processes are often not smooth. Therefore, there is a need to improve the trigger stability of a trigger assembly.

SUMMARY OF THE INVENTION

The present disclosure provides a trigger assembly for an inhaler, and an inhaler.

According to an aspect, the present disclosure provides a trigger assembly for an inhaler, including: a first component including a guide support; a second component, wherein the first component and the second component are configured such that the second component can move away from the first component to a preloaded position in the case where the second component rotates relative to the first component in a first direction; and a first actuator configured to block the second component from leaving the preloaded position in the case where the second component has been moved to the preloaded position, and configured to, upon being triggered, release the second component such that the second component moves to a triggered position toward the first component; wherein the first actuator abuts against the guide support.

According to another aspect, the present disclosure provides an inhaler, including a trigger assembly configured to trigger the inhaler to spray atomized fluid, the trigger assembly including: a first component including a guide support; a second component, wherein the first component and the second component are configured such that the second component can move away from the first component to a preloaded position in the case where the second component rotates relative to the first component in a first direction; and a first actuator configured to block the second component from leaving the preloaded position in the case where the second component has been moved to the preloaded position, and configured to, upon being triggered, release the second component such that the second component moves to a triggered position toward the first component; wherein the first actuator abuts against the guide support.

BRIEF DESCRIPTION OF THE DRAWINGS

More details, features, and advantages of the present disclosure are disclosed in the following description of exemplary embodiments with reference to the accompanying drawings, in which.

DETAILED DESCRIPTION

Figure 1:
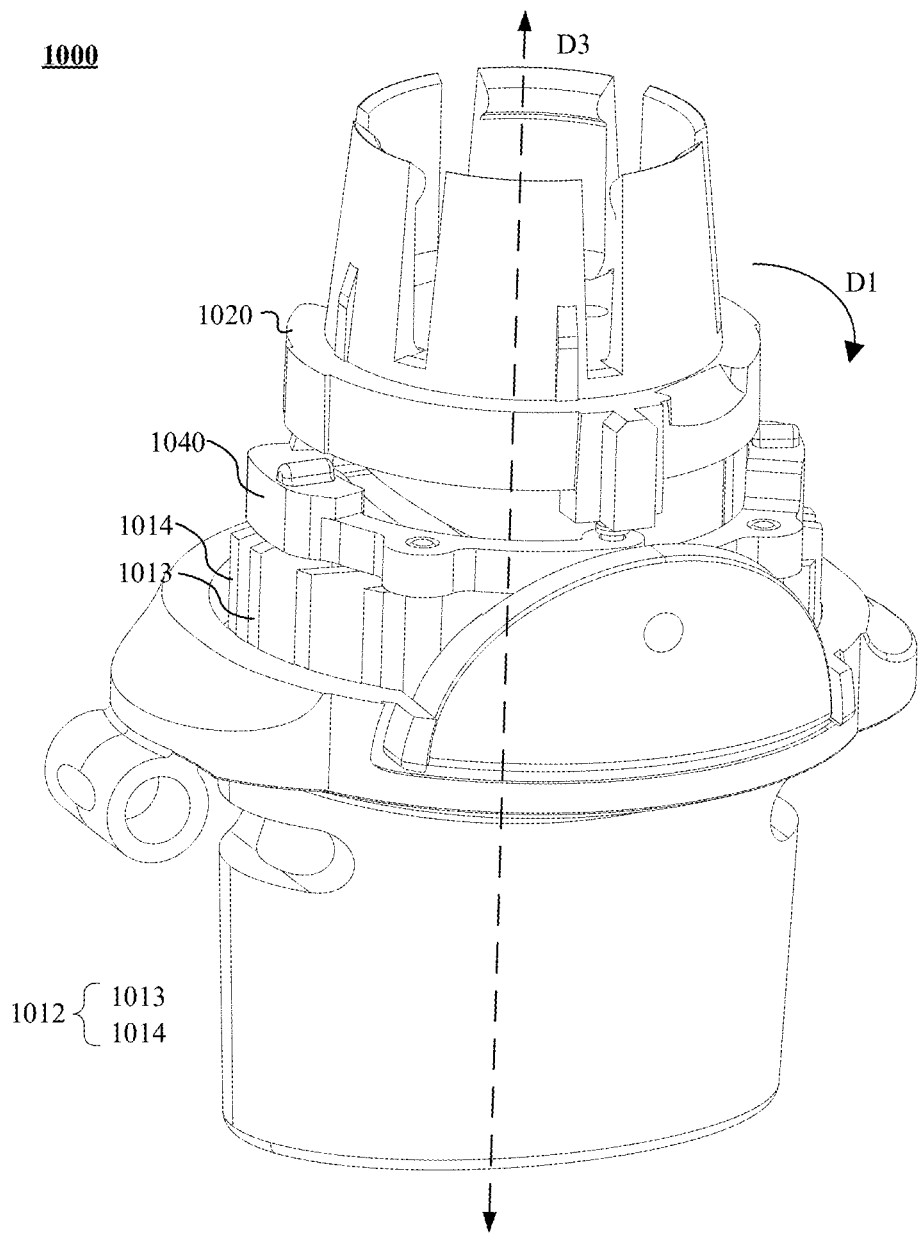
FIG. 1 is a schematic diagram illustrating a trigger assembly for an inhaler in a triggered position state according to an exemplary embodiment.

In the present disclosure, unless otherwise stated, the terms "first", "second", etc., used to describe various elements are not intended to limit the positional, temporal or importance relationship of these elements, but rather only to distinguish one component from another. In some examples, a first element and a second element may refer to a same instance of the element, and in some cases, based on contextual descriptions, the first element and the second element may also refer to different instances.

In the scope of the present disclosure, a "inhaler" refers to an apparatus for atomizing a liquid. Typically, the inhaler is configured to atomize a fluid (e.g., a liquid drug or similar fluid) and spray the atomized fluid to the mouth or nose of a user (e.g., a patient).

The present disclosure provides a trigger assembly for an inhaler, and an inhaler. In the scope of the present disclosure, a "trigger assembly" refers to an assembly for controlling the triggering of the inhaler, for example, an assembly capable of controlling or preventing spraying operation of the inhaler. The trigger assembly can be mounted in the inhaler and can be in linkage with a push switch or rotary switch of the inhaler. A second component is blocked from leaving a preloaded position by an actuator in the case where the second component has been moved to the preloaded position, and the second component is released upon the actuator being triggered, such that the second component moves to a triggered position toward a first component, to achieve reliable switching of the trigger assembly between the preloaded position and the triggered position.

In the scope of the present disclosure, the "preloaded position" of the trigger assembly may refer to a position where a liquid in the inhaler is loaded to be prepared for outward spraying (e.g., from a reservoir into a pumping chamber). In this position, if there is no triggering action of an external force, the inhaler cannot spray, and only by triggering the trigger assembly, for example, by manually operating (e.g., pressing), the trigger assembly can be restored from the "preloaded position" to the "triggered position", the liquid in the inhaler is switched from a state in which the liquid is already loaded for pre-spraying, to a state of spraying. In the "triggered position", the inhaler can be operated (e.g., rotated) again to the "preloaded position", and therefore the "triggered position" may also be referred to as an initial position.

Embodiments of the present disclosure will be described in detail below with reference to the accommodating drawings. The following embodiments are merely used to explain the technical solutions of the present disclosure more clearly, and therefore they are merely used as examples, and are not intended to limit the scope of protection of the present disclosure.

FIG. 1 is a schematic diagram illustrating a trigger assembly for an inhaler in a triggered position state according to an exemplary embodiment. Referring to FIG. 1, the trigger assembly 1000 includes: a first component 1010, a second component 1020, and an actuator 1040.

The first component 1010 and the second component 1020 are configured such that the second component 1020 can move away from the first component 1010 to the preloaded position when rotating relative to the first component 1010 in the first direction D1. For example, referring to FIGS. 1 to 4, starting from the position shown in FIG. 1, the second component 1020 rotates relative to the first component 1010 in a clockwise direction in FIG. 1, and as shown in FIGS. 2 and 3, as the second component 1020 rotates, the second component 1020 gradually moves away from the first component 1010; and as the second component 1020 further rotates in the clockwise direction, the second component 1020 has been moved to the preloaded position as shown in FIG. 4. In an example, the rotational movement between the first component 1010 and the second component 1020 can be converted into a relative movement between the two components by means of a gear and rack mechanism or a screw mechanism.

The first component 1010 further includes a rib 1012. The rib 1012 may be a plate-like structure having a thickness (the plate-like structure may, for example, refer to a structure having a smaller thickness relative to its width and length) and extending in a second direction D2 from an outer surface of the first component 1010 in the second direction D2, so that a structure of the first component 1010 can be strengthened. Moreover, the first actuator 1040 may abut against the rib 1012, the rib 1012 may then support or limit the first actuator 1040 in an axial direction D3, such that a movement of the first actuator 1040 relative to the first component 1010 is smooth, the unexpected jitter or displacement of the first actuator 1040 in the axial direction D3 can be avoided during the movement.

The rib 1012 may be in the specific form of a flat plate or a bent plate, and the specific form of the rib 1012 is not limited in the present disclosure.

The first actuator 1040 is configured to block the second component 1020 from leaving the preloaded position in the case where the second component 1020 has been moved to the preloaded position, and configured to, upon being triggered, release the second component 1020 such that the second component 1020 moves toward the first component 1010 to the triggered position under the action of an elastic member 1030. For example, the first actuator 1040 may have a surface for blocking the second component 1020, and the position of the first actuator 1040 relative to the second component 1020 can vary with triggering to release the second component 1020. Thus, the reliable switching of the trigger assembly 1000 between the preloaded position and the triggered position is achieved.

It can be seen from FIGS. 1 to 4 that, during the rotation of the second component 1020 relative to the first component 1010, no interference is caused to the rotation of the second component 1020 since the first actuator 1040 surrounds the circumference of the first component 1010. Conversely, as the second component 1020 rotates, the first actuator 1040 moves relative to an outer circumferential surface of the second component 1020. When the second component 1020 has been moved to the preloaded position as shown in FIG. 4, the first actuator 1040 may abut against the second component 1020 to block the second component 1020 from leaving the preloaded position.

In some embodiments, an upper surface of the bearing portion 1042 in FIG. 4 abuts against a lower surface of a portion of the second component 1020, so as to prevent further downward movement of the second component 1020 away from the preloaded position. For example, a main body 1041 of the first actuator 1040 may have a substantially annular shape, such that an inner circumference of the first actuator 1040 can substantially surround the first component 1010 or the second component 1020 having a substantially cylindrical outer surface. The bearing portion 1042 of the first actuator 1040 extends radially from the annular main body 1041 toward an annular interior.

In some embodiments, the first actuator 1040 may be configured such that: the second component 1020 can just abut against the bearing portion 1042 of the first actuator 1040 when the second component 1020 is disengaged from the first component 1010. For example, the first actuator 1040 may be constructed as described above by setting the size of the main body 1041 of the first actuator 1040. For example, the first actuator 1040 may be constructed as described above by setting the position of the bearing portion 1042 of the first actuator 1040. In an example, the first actuator 1040 may be connected to the first component 1010, and the bearing portion 1042 of the first actuator 1040 may be arranged at a position where the second component 1020 is exactly disengaged from the first component 1010. Thereby, when the second component 1020 is disengaged from the first component 1010, by the bearing portion 1042 smoothly abuts against the second component 1020, thereby achieving a smooth transition of the second component 1020 from the intermediate state to the preloaded state, without causing a small amount of liquid spray caused by a non-smooth transition.

For still another example, the bearing portion 1042 may be configured to be disengaged from the second component 1020 to release the second component 1020 upon the first actuator 1040 being triggered. For example, the first actuator 1040 may be constructed as described above by setting the size of the bearing portion 1042 of the first actuator 1040. In an example, with continued reference to FIGS. 1-4, the distance by which the bearing portion 1042 extends inwards can allow the bearing portion 1042 to abut against the second component 1020. In this way, when the second component 1020 needs to switch from the preloaded position to the triggered position, the second component 1020 can be released by slightly moving the position of the bearing portion 1042 (e.g., slightly moving the bearing portion 104 radially outwards in FIG. 5).

Thus, by arranging the rib 1012 at the first component 1010 and allowing the first actuator 1040 to abut against the rib 1012, the structural stability of the first component 1010 and the entire trigger assembly 1000 is improved. Meanwhile, the movement of the first actuator 1040 relative to the first component 1010 can also be smooth and steady, the unexpected jitter or displacement of the first actuator 1040 in the axial direction D3 can be avoided during the movement, the stable switching of the trigger assembly 1000 between the preloaded position and the triggered position can be achieved, and the trigger stability is thus improved.

In some embodiments, the first actuator 1040 further includes an actuator guiding member 1041, wherein the actuator guiding member 1041 is movable relative to the rib 1012 in a manner mating with the rib 1012. When the trigger assembly 1000 is switched between the preloaded position and the triggered position, the rib 1012 is connected to the first component 1010 and is fixed in position, and the first actuator 1040 moves relative to the trigger assembly. During the movement of the first actuator 1040 as described above, the actuator guiding member 1041 of the first actuator 1040 always fits with the rib 1012, so that the rib 1012 can guide the movement of the first actuator 1040 and control a movement trajectory of the first actuator 1040 and thus the stable switching of the trigger assembly 1000 between the preloaded position and the triggered position, and the trigger stability is thus improved.

Figure 4:
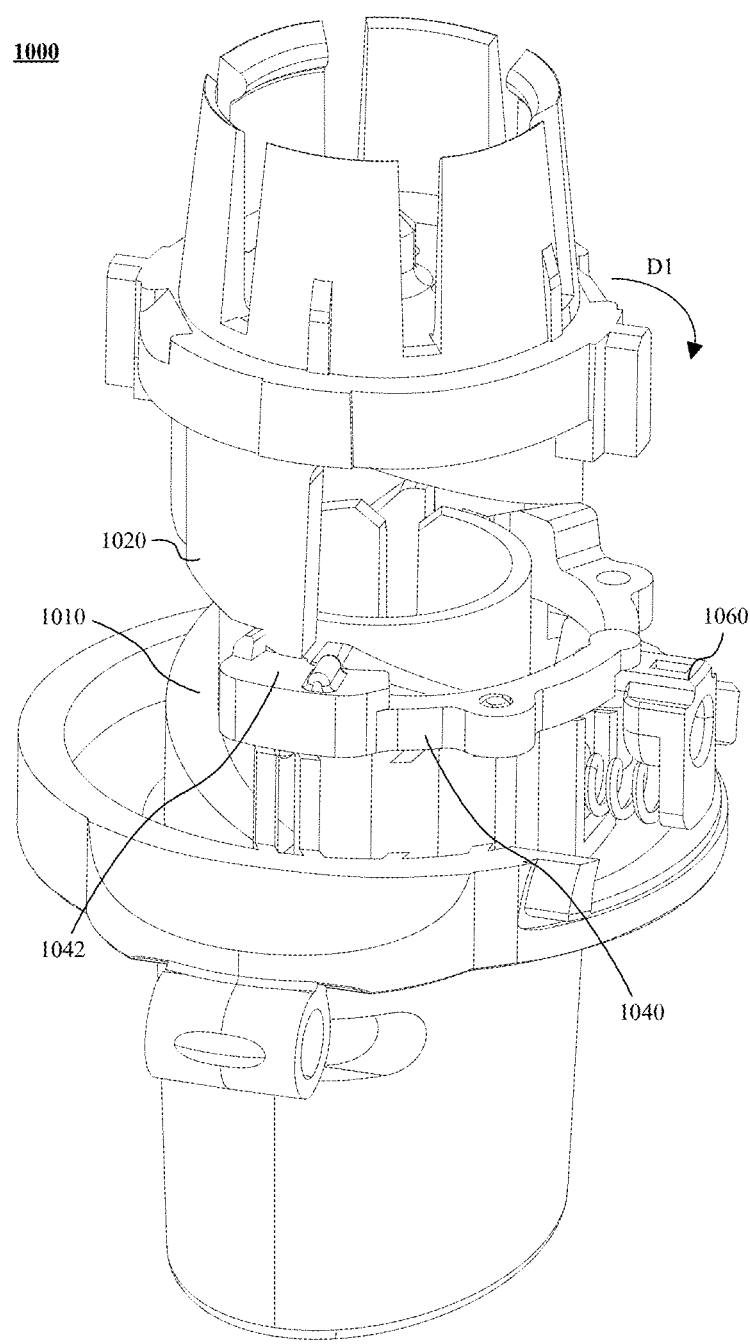
FIG. 4 is a schematic diagram illustrating a trigger assembly for an inhaler in a preloaded position state according to an exemplary embodiment.

In some embodiments, as shown in FIG. 4, the trigger assembly 1000 further includes a button connector 1060, the button connector 1060 is connected to the first actuator 1040, and the first actuator 1040 moves relative to the first component 1010 by operating the button connector 1060. For example, the button connector 1060 may be connected to a button of the inhaler, and a user may press, for example, by pressing the button, the button connector 1060 to operate the first actuator 1040.

Figure 2:
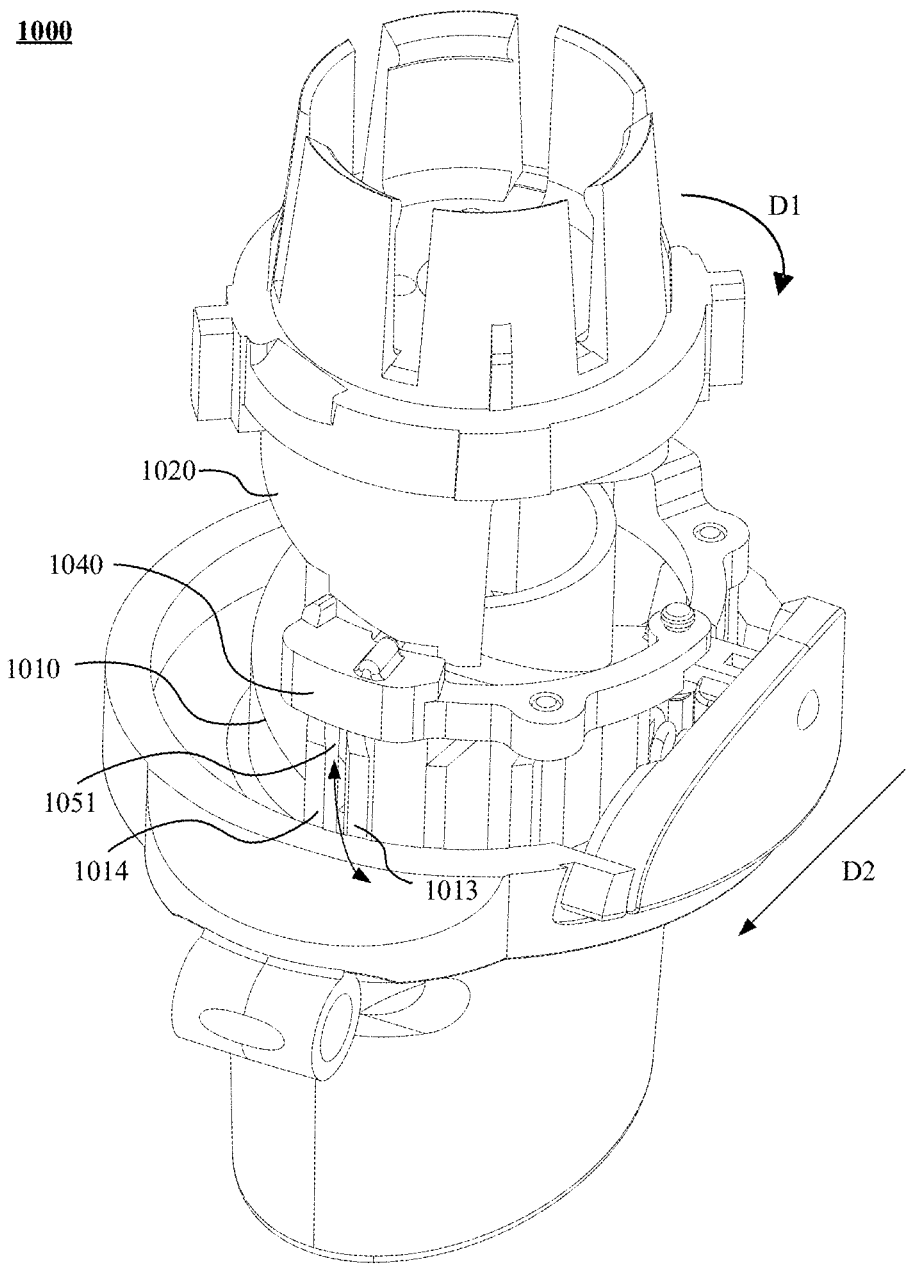
FIG. 2 is a schematic diagram illustrating a trigger assembly for an inhaler in an intermediate state according to an exemplary embodiment.

In some embodiments, as shown in FIG. 2, the rib 1012 includes a first rib 1013 and a second rib 1014, and a first sliding groove 1051 is defined between the first rib 1013 and the second rib 1014. The actuator guiding member 1041 includes a first slider 1041, and the first slider 1041 is configured to slide in the first sliding groove 1051 to guide the movement of the first actuator 1040 relative to the first component 1010. As the first slider 1041 slides along in the first sliding groove 1051, the first actuator 1040 can stably switch between the preloaded position and the triggered position, and the trigger stability is thus improved.

Thereby, by providing two ribs (the first rib 1013 and the second rib 1014), the structural support of the ribs to the first actuator 1040 can be enhanced, the movement trajectory of the first actuator 1040 can also be further controlled accurately by means of the sliding of the first slider 1041 in the first sliding groove 1051 formed between the two ribs, such that the first actuator 1040 can stably switch between the preloaded position and the triggered position, and the trigger stability is thus improved.

In some embodiments, as shown in FIG. 2, the first rib 1013 and the second rib 1014 extend substantially in the second direction D2, and the second direction D2 is a radial direction away from the first component 1010. Since the first rib 1013 and the second rib 1014 extend substantially in the second direction D2, the orientation of the first sliding groove 1051 is defined to also extend substantially in the second direction D2, so that a moving range of the first actuator 1040 in the second direction D2 is increased, avoiding an excessively small travel range which otherwise blocks the stable switching of the first actuator 1040 between the preloaded position and the triggered position.

Figure 8:
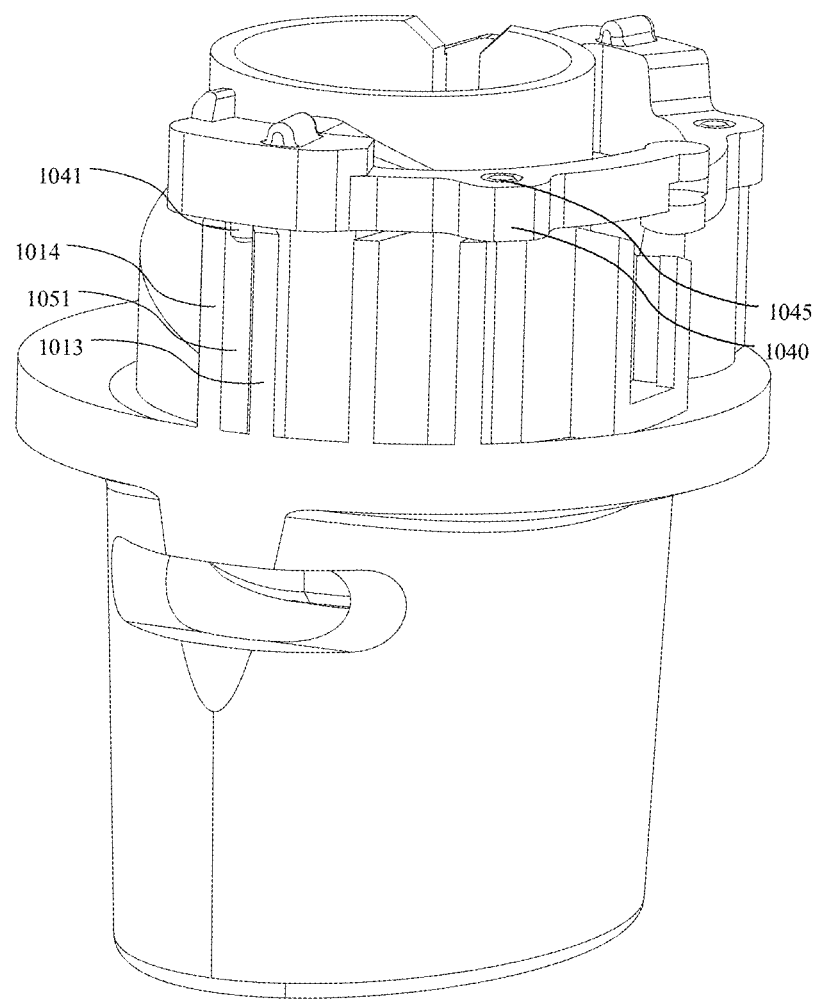
FIG. 8 is a schematic diagram illustrating a first actuator fitting with a first rib and a second rib (with an outer wall of an upper housing omitted) according to an exemplary embodiment.

In some embodiments, the first sliding groove 1051 has approximately the same widths at different positions in the second direction D2. As shown in FIG. 8, the widths of the first sliding groove 1051 at the different positions in the second direction D2 can be substantially adapted to the first slider 1041. Thus, the accuracy of the control of the movement trajectory of the first actuator 1040 can be improved, so that the first actuator 1040 can stably switch between the preloaded position and the triggered position, and the trigger stability can be thus improved.

In some embodiments, the movement of the first actuator 1040 relative to the first component 1010 includes a translational movement close to or away from the first component 1010. The translational movement refers to a straight line created by connecting any two points on a movement component, wherein the movement component is always kept parallel throughout the movement without a relative rotation between any two of the points of the movement component. When the first actuator 1040 moves close to or away from the first component 1010, the first actuator 1040 needs a small movement space, which facilitates the arrangement of internal structures of the trigger assembly 1000.

Figure 5:
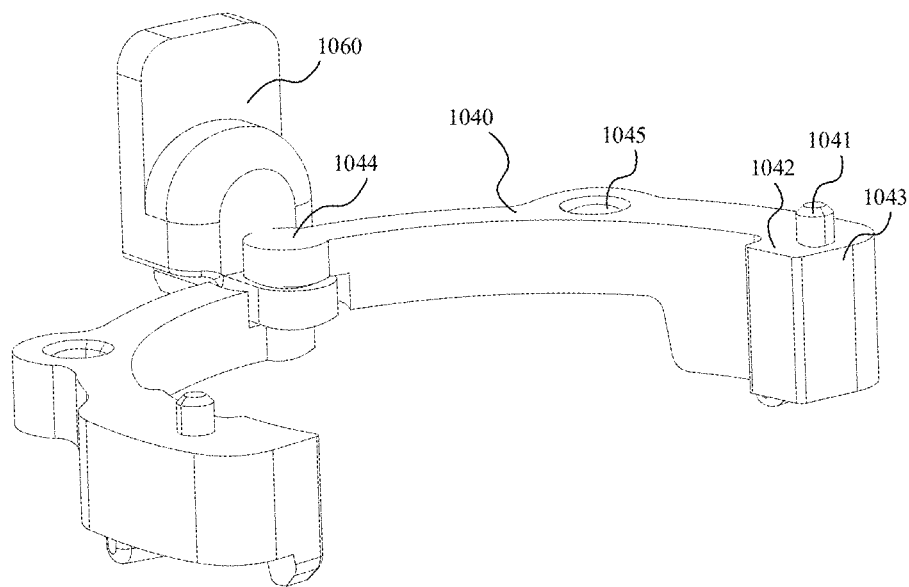
FIG. 5 is a schematic diagram illustrating an actuator and a button connector of a trigger assembly for an inhaler according to an exemplary embodiment.
Figure 6:
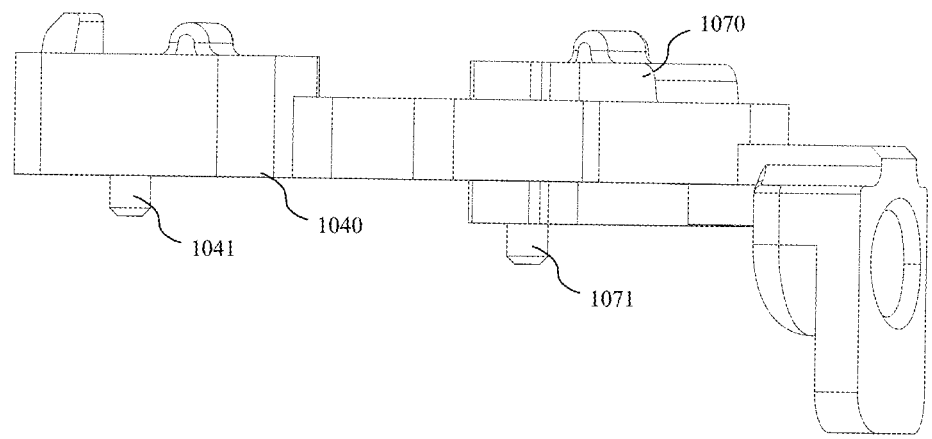
FIG. 6 is another schematic diagram illustrating an actuator and a button connector of a trigger assembly for an inhaler according to an exemplary embodiment.
Figure 7:
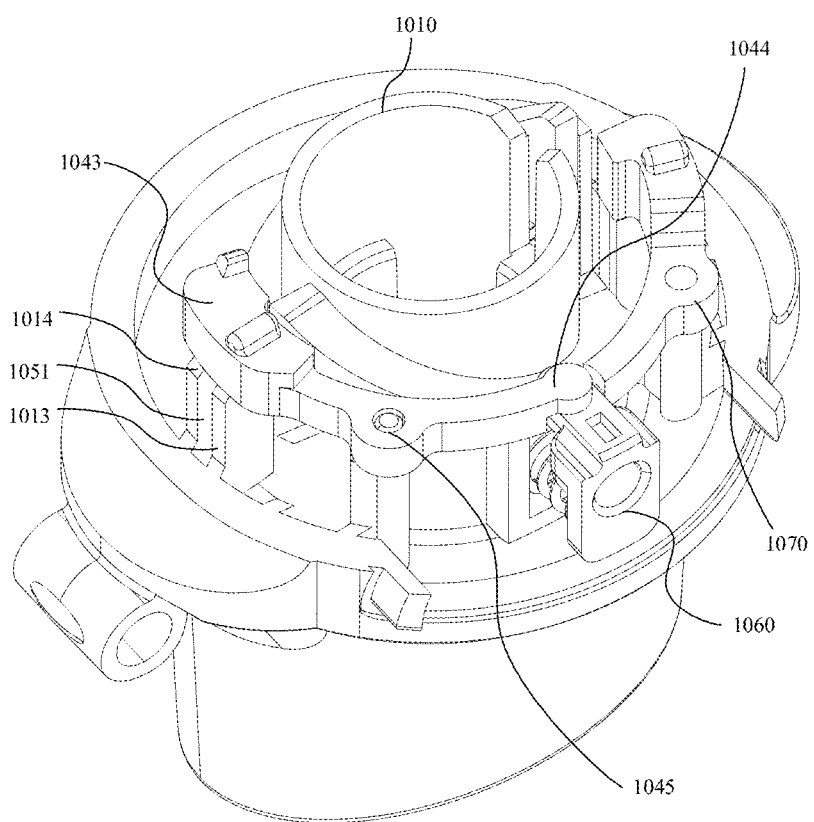
FIG. 7 is a schematic diagram illustrating an actuator and a button connector, which are mounted on a first component, of a trigger assembly for an inhaler according to an exemplary embodiment.

In some embodiments, as shown in FIGS. 5, 6, and 7, the first actuator 1040 is configured in the form of a curved bar arranged at least partially around at least one of the first component 1010 or the second component 1020, wherein the curved bar includes a first end 1043 and a second end 1044, the first end 1043 is used to block the second component 1020 from leaving the preloaded position, the second end 1044 is connected to the button connector 1060, and the first end 1043 moves relative to the first component 1010 by operating the button connector 1060. In this way, when the user presses the button connector 1060 by pressing the button, the second end 1044 of the first actuator 1040 moves radially inwards (toward the first component 1010) to allow the first actuator 1040 in the form of the curved bar to rotate around its own connecting portion 1045, and the first end 1043 thus moves radially outwards (away from the first component 1010).

In some embodiments, as shown in FIGS. 5, 6, and 7, the first actuator 1040 further includes a connecting portion 1045 between the first end 1043 and the second end 1044, wherein the first actuator 1040 is configured to be pivotable around the connecting portion 1045 such that the first end 1043 is movable relative to the first component 1010.

In some embodiments, the connecting portion 1045 includes a pivot shaft, a pivot hole, or any other mechanical structure which enables pivoting around the connecting portion 1045.

In some embodiments, the ratio of a distance between the first end 1043 and the connecting portion 1045 to a distance between the first end 1043 and the second end 1044 is in a range of 0.3-0.7. As shown in FIG. 8, since the first end 1043 and the second end 1044 are distributed at two ends of the connecting portion 1045 (a pivot shaft), the ratio of the distance between the first end 1043 and the connecting portion 1045 to the distance between the first end 1043 and the second end 1044 is limited at about 0.5, so that the moving ranges of the first end 1043 and the second end 1044 do not have an excessively large difference therebetween, which facilitates the control of a moving trajectory of the first end 1043 and thus improves the trigger stability.

Since the first actuator 1040 may have a partially curvilinear configuration (e.g., a circular arc or an elliptical arc, or the like), the distance between the first end 1043 and the connecting portion 1045 may be a linear distance between the first end 1043 and the connecting portion 1045. Similarly, the distance between the first end 1043 and the second end 1044 may be a linear distance between the first end 1043 and the second end 1044.

In some embodiments, the ratio of a distance between the first end 1043 and the connecting portion 1045 to a distance between the first end 1043 and the second end 1044 is in a range of 0.4-0.6. In some other embodiments, the ratio of the distance between the first end 1043 and the connecting portion 1045 to the distance between the first end 1043 and the second end 1044 is 0.5.

Figure 3:
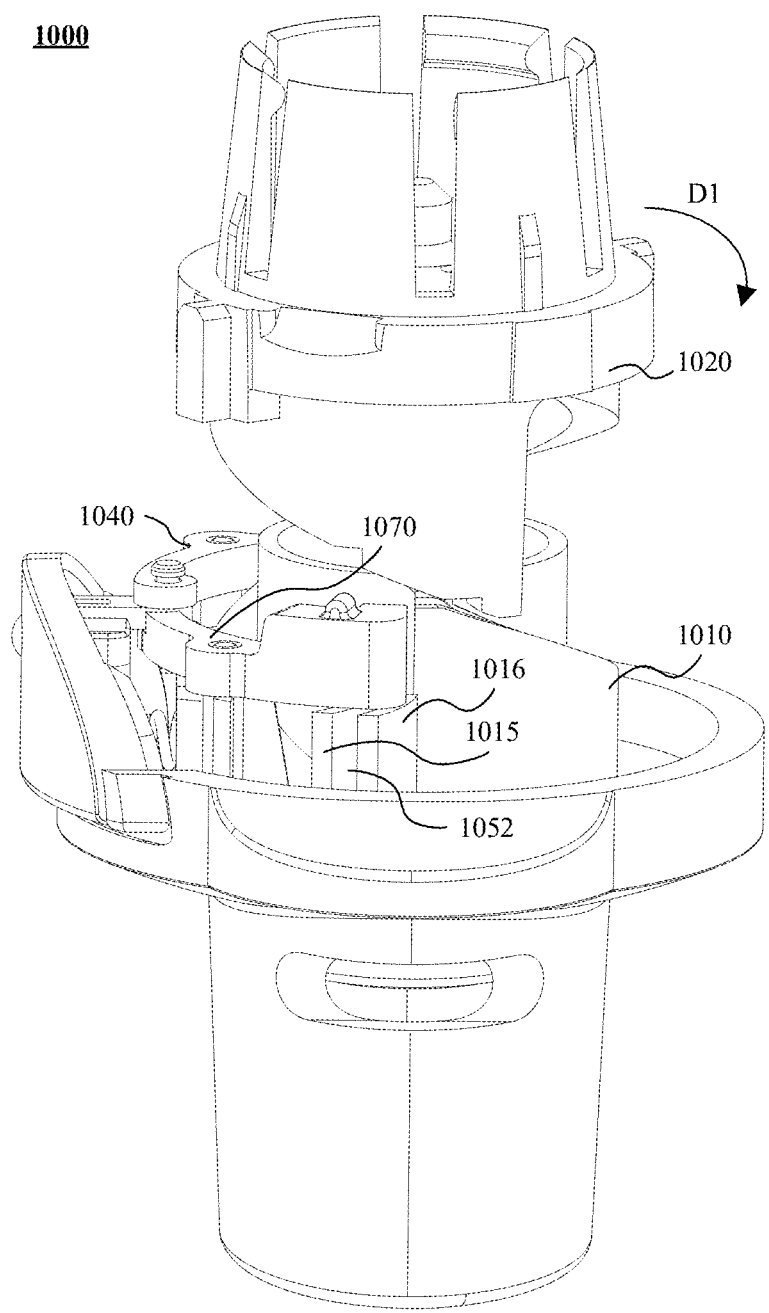
FIG. 3 is another schematic diagram illustrating a trigger assembly for an inhaler in an intermediate state according to an exemplary embodiment.
Figure 9:
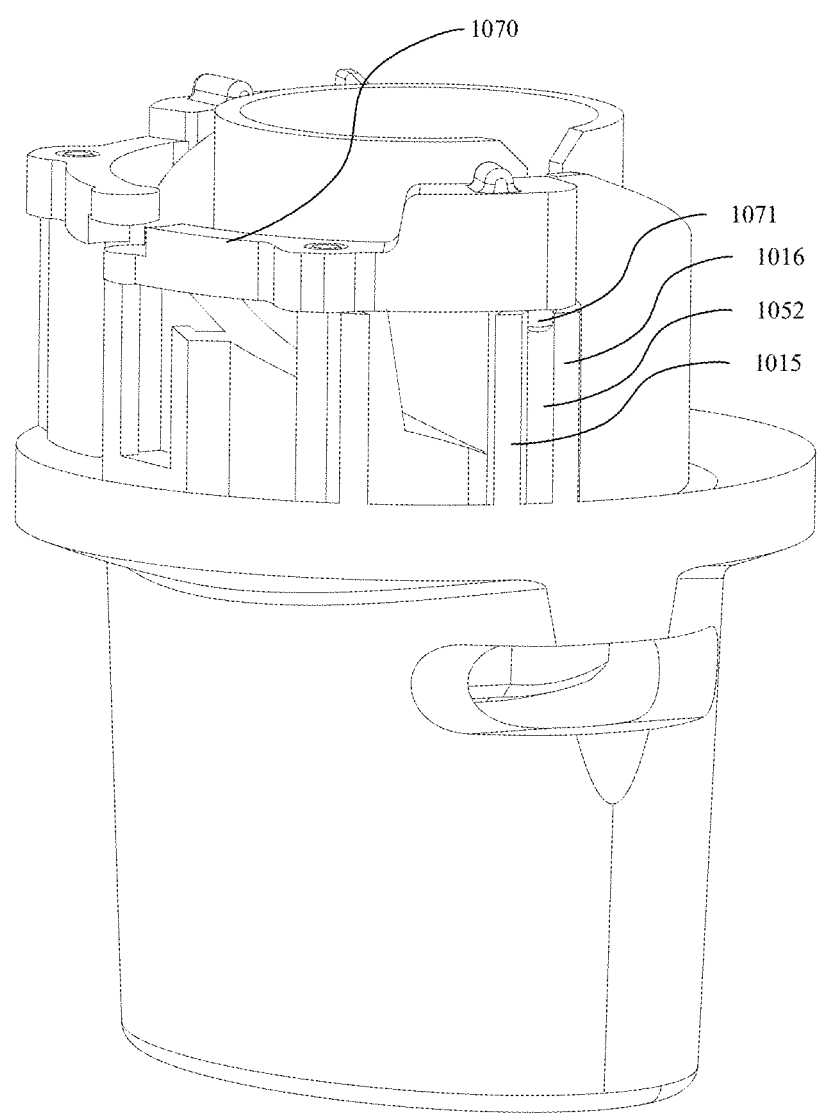
FIG. 9 is a schematic diagram illustrating a second actuator fitting with a third rib and a fourth rib (with an outer wall of an upper housing omitted) according to an exemplary embodiment.

In some embodiments, as shown in FIGS. 3 and 7, the trigger assembly 1000 further includes a second actuator 1070 which is configured to block the second component 1020 from leaving the preloaded position in the case where the second component 1020 has been moved to the preloaded position, and configured to, upon being triggered, release the second component 1020 such that the second component 1020 moves toward the first component 1010 to the triggered position. The second actuator 1070 includes a second slider 1071. The rib 1012 further includes a third rib 1015 and a fourth rib 1016, and a second sliding groove 1052 is defined between the third rib 1015 and the fourth rib 1016. Similar to the first slider 1041, as shown in FIG. 9, the second slider 1071 is configured to slide in the second sliding groove 1052, so as to guide the movement of the second actuator 1070 relative to first component 1010. In the radial direction, the first actuator 1040 and the second actuator 1070 may be arranged on two substantially opposite sides of the first component 1010. Thereby, the first actuator 1040 and the second actuator 1070 simultaneously control the position of the second component 1020 in two directions, which further achieves the reliable switching of the trigger assembly 1000 between the preloaded position and the triggered position and thus improves the trigger stability.

In some embodiments, the third rib 1015 and the fourth rib 1016 are arranged symmetrically with the first rib 1013 and the second rib 1014. For example, as shown in FIG. 9, the first rib 1013 and the second rib 1014 are both arranged on the left side of the first component 1010, and the third rib 1015 and the fourth rib 1016 are arranged on the right side of the first component 1010. Since a cross section of the first component 1010 may be of a substantially cylindrical structure, the left side and the right side mentioned above may be two diametrical ends of the cylindrical first component 1010, and the movement ranges of the first actuator 1040 and the second actuator 1070 can be thus more effectively limited to the two substantially opposite sides of the first component 1010. Thereby, the first actuator 1040 and the second actuator 1070 simultaneously control the position of the second component 1020 in two directions, which further achieves the reliable switching of the trigger assembly 1000 between the preloaded position and the triggered position and thus improves the trigger stability.

In some embodiments, the actuator guiding member 1041 includes a slot (not shown) formed in a surface of the first actuator 1040 facing the rib 1012, wherein when the first actuator 1040 moves relative to the rib 1012, the rib 1012 is at least partially positioned in the slot, and the first actuator 1040 can move along the rib 1012 to guide the movement of the first actuator 1040 relative to the first component 1010. Thereby, the first actuator 1040 can be guided by means of the rib 1012 without an additional component, and the number of components of the trigger assembly 1000 can be decreased while the reliable switching of the trigger assembly 1000 can be achieved between the preloaded position and the triggered position to improve the trigger stability.

Figure 10:
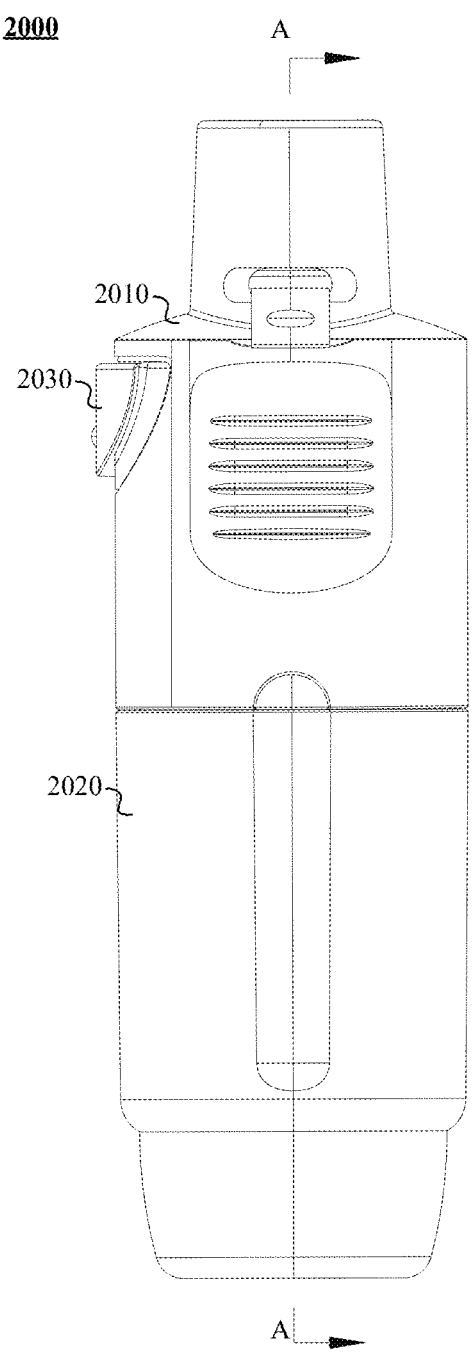
FIG. 10 is a side view illustrating an inhaler according to an exemplary embodiment.
Figure 12:
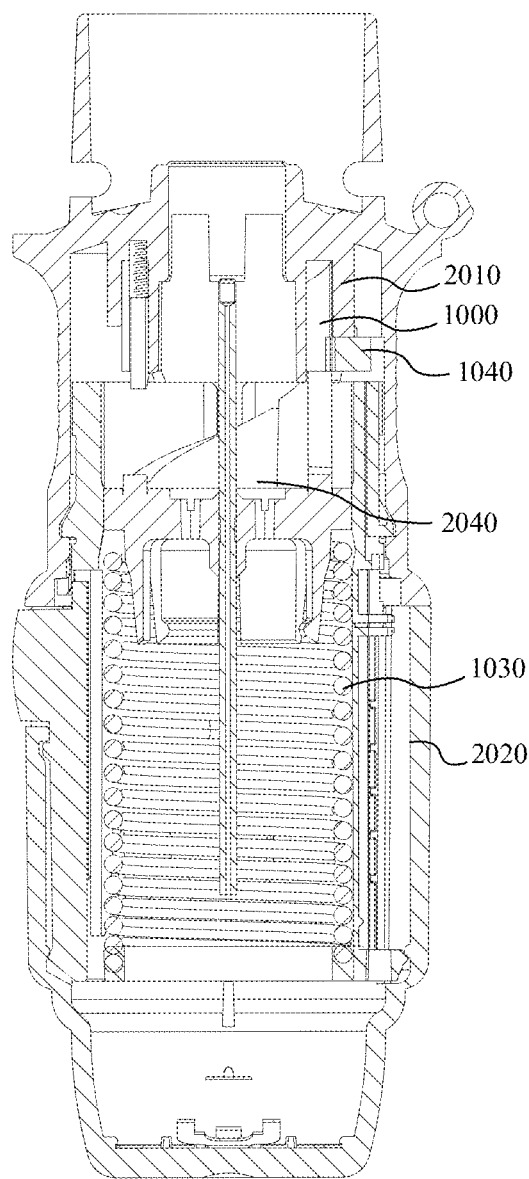
FIG. 12 is a cross-sectional view of the inhaler of FIG. 10 along section A-A according to an exemplary embodiment.

In some embodiments, as shown in FIGS. 10 and 12, the elastic member 1030 is configured to store energy as the second component 1020 moves away from the first component 1010. For example, the elastic member 1030 may include a spring or other types of elastic members, as long as energy can be stored by means of elastic deformation. In an example, the elastic member 1030 (e.g., the spring) may be arranged on a side of the second component 1020 close to the first component 1010, when the second component 1020 moves away from the first component 1010, tensile deformation occurs to store energy, and when the elastic member 1030 springs back, the second component 1020 can be pushed into the triggered position by means of a pull force; and in an example shown in FIG. 10, the elastic member 1030 (e.g., the spring) may be arranged on a side of the second component 1020 away from the first component 1010, when the second component 1020 moves away from the first component 1010, compressive deformation occurs to store energy, and when the elastic member 1030 springs back, the second component 1020 can be pushed into the triggered position by means of a push force.

In a second aspect, the present disclosure provides an inhaler 2000. The inhaler 2000 includes the trigger assembly 1000 of the present disclosure. The trigger assembly 1000 is configured to trigger the inhaler 2000 to spray atomized fluid.

The inhaler of the present disclosure will be further described below with respect to FIGS. 10 to 12. FIG. 10 is a side view illustrating the inhaler 2000 according to an exemplary embodiment; FIG. 9 is a partial cross-sectional view illustrating an upper housing of an inhaler according to an exemplary embodiment; and FIG. 10 is a cross-sectional view of the inhaler of FIG. 10 along section A-A according to an exemplary embodiment.

Figure 11:
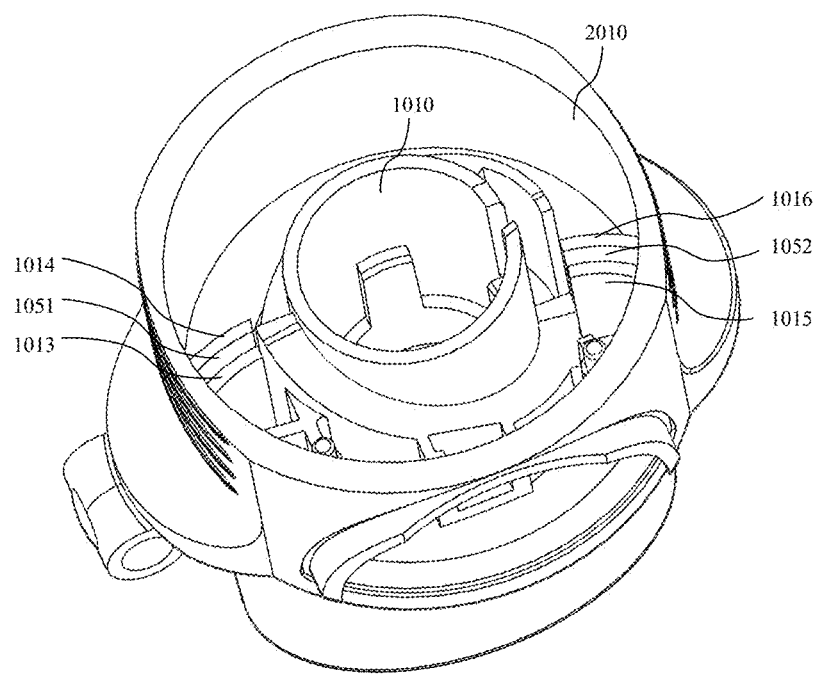
FIG. 11 is a partial cross-sectional view illustrating an upper housing of an inhaler according to an exemplary embodiment.

As shown in FIGS. 10 to 12, the inhaler 2000 may include an upper housing 2010, a lower housing 2020, a button 2030 arranged in the upper housing, and a delivery tube socket 2040 arranged in the lower housing 2020.

In some embodiments, as shown in FIGS. 10 to 12, the first component 1010 may be constructed as the upper housing 2010 of the inhaler 2000, and by rotating the lower housing 2020 relative to the upper housing 2010, the second component 1020 of the trigger assembly 1000 arranged in the inhaler 2000 can rotate relative to the first component 1010, and the second component 1020 moves away from the first component 1010 to the preloaded position. In this process, part of the liquid stored in a tank of the inhaler 2000 may be pumped, for example, into a pumping chamber of the inhaler 2000 for atomization and spraying.

In some embodiments, as shown in FIG. 9, two ends of each of the first rib 1013, the second rib 1014, the third rib 1015 and the fourth rib 1016 may be respectively connected to the first component 1010 and the housing 2010 in the radial direction, and the overall structural strength of the inhaler 2000 is thus improved, which is also conducive to more accurately controlling the degree of accuracy of the movement trajectory control of at least one of the first actuator 1040 or the second actuator 1070 and thus improves the trigger stability.

What is claimed is:

1. A trigger assembly for an inhaler, comprising:
   a first component comprising a guide support;
   a second component, wherein the first component and the second component are configured such that the second component is capable of moving away from the first component to a preloaded position in the case where the second component rotates relative to the first component in a first direction;
   a first actuator configured to block the second component from leaving the preloaded position in the case where the second component has been moved to the preloaded position, and configured to, upon being triggered, release the second component such that the second component moves toward the first component to a triggered position,
   wherein the first actuator abuts against the guide support.

2. The trigger assembly according to claim 1, wherein the guide support is a rib.

3. The trigger assembly according to claim 2, wherein the first actuator comprises an actuator guiding member, and wherein the actuator guiding member is movable relative to the rib in a manner mating with the rib to guide the movement of the first actuator relative to the first component.

4. The trigger assembly according to claim 3, wherein the rib comprises a first rib and a second rib, a first sliding groove being defined between the first rib and the second rib,
   and wherein the actuator guiding member comprises a first slider configured to slide in the first sliding groove to guide the movement of the first actuator relative to the first component.

5. The trigger assembly according to claim 4, wherein the first rib and the second rib substantially extend in a second direction, the second direction being a radial direction away from the first component.

6. The trigger assembly according to claim 5, wherein the first sliding groove has approximately the same widths at different positions in the second direction.

7. The trigger assembly according to claim 4, wherein the movement of the first actuator relative to the first component comprises: a translational movement close to or away from the first component.

8. The trigger assembly according to claim 4, wherein the first actuator is configured as a curved bar arranged at least partially around at least one of the first component or the second component,
   and wherein the curved bar comprises a first end and a second end, the first end being configured to block the second component from leaving the preloaded position, the second end being connected to a button connector, the first end being movable relative to the first component by operating the button connector.

9. The trigger assembly according to claim 8, wherein the first actuator further comprises a connecting portion between the first end and the second end,
   and wherein the first actuator is pivotable around the connecting portion, such that the first end is capable of moving relative to the first component.

10. The trigger assembly according to claim 9, wherein the connecting portion comprises a pivot shaft or a pivot hole.

11. The trigger assembly according to claim 9, wherein a ratio of a distance between the first end and the connecting portion to a distance between the first end and the second end is in a range of 0.3-0.7.

12. The trigger assembly according to claim 11, wherein the ratio of the distance between the first end and the connecting portion to the distance between the first end and the second end is 0.5.

13. The trigger assembly according to claim 4, further comprising:
    a second actuator configured to block the second component from leaving the preloaded position in the case where the second component has been moved to the preloaded position, and configured to, upon being triggered, release the second component such that the second component moves toward the first component to the triggered position, the second actuator comprising a second slider,
    wherein the rib further comprises a third rib and a fourth rib, a second sliding groove being defined between the third rib and the fourth rib,
    and wherein the second slider is configured to slide in the second sliding groove to guide the movement of the second actuator relative to the first component.

14. The trigger assembly according to claim 13, wherein the third rib and the fourth rib are arranged symmetrical with the first rib and the second rib.

15. The trigger assembly according to claim 3, wherein the actuator guiding member comprises a slot formed in a surface of the first actuator facing the rib,
    and wherein the rib is at least partially positioned in the slot, and the first actuator is movable along the rib by means of the slot to guide the movement of the first actuator relative to the first component.

16. The trigger assembly according to claim 1, further comprising an elastic member configured to store energy when the second component moves away from the first component, wherein the second component moves, upon being released, toward the first component to the triggered position under an action of the elastic member.

17. An inhaler, comprising a trigger assembly configured to trigger the inhaler to spray atomized fluid, the trigger assembly comprising:
    a first component comprising a guide support;
    a second component, wherein the first component and the second component are configured such that the second component is capable of moving away from the first component to a preloaded position in the case where the second component rotates relative to the first component in a first direction;
    a first actuator configured to block the second component from leaving the preloaded position in the case where the second component has been moved to the preloaded position, and configured to, upon being triggered, release the second component such that the second component moves toward the first component to a triggered position,
    wherein the first actuator abuts against the guide support.

18. The inhaler according to claim 17, wherein the first component is constructed as an upper housing of the inhaler, the second component is constructed as a delivery tube socket of the inhaler, and wherein the delivery tube socket is configured to be rotatable with rotation of a lower housing of the inhaler.

\* \* \* \* \*